United States Patent
Barnes et al.

(10) Patent No.: US 7,512,308 B2
(45) Date of Patent: Mar. 31, 2009

(54) OPTICAL FIBER TRANSITION DEVICE

(75) Inventors: Brandon A. Barnes, Ft. Worth, TX (US); Bradley S. Billman, Denton, TX (US); Sean M. Kerr, Keller, TX (US); Joshua D. Raker, Lewisville, TX (US); Charles A. Yow, Jr., Ft. Worth, TX (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/479,254

(22) Filed: Jun. 30, 2006

(65) Prior Publication Data

US 2008/0013888 A1  Jan. 17, 2008

(51) Int. Cl.
*G02B 6/00* (2006.01)
(52) U.S. Cl. .................... 385/139; 385/76; 385/100
(58) Field of Classification Search .................. None
See application file for complete search history.

(56) References Cited

U.S. PATENT DOCUMENTS

| | | | |
|---|---|---|---|
| 5,231,688 A * | 7/1993 | Zimmer | 385/139 |
| 5,892,871 A * | 4/1999 | Dahan et al. | 385/86 |
| 5,943,462 A * | 8/1999 | Schofield et al. | 385/100 |
| 6,389,214 B1 * | 5/2002 | Smith et al. | 385/136 |
| 6,738,555 B1 * | 5/2004 | Cooke et al. | 385/136 |
| 6,979,133 B2 * | 12/2005 | Montena | 385/80 |
| 2005/0031276 A1* | 2/2005 | Zimmel et al. | 385/100 |
| 2005/0111800 A1* | 5/2005 | Cooke et al. | 385/100 |
| 2005/0265672 A1 | 12/2005 | Theuerkorn et al. | 385/100 |
| 2005/0276551 A1* | 12/2005 | Brown et al. | 385/100 |
| 2006/0133759 A1* | 6/2006 | Mullaney et al. | 385/139 |

* cited by examiner

*Primary Examiner*—Sung H Pak
*Assistant Examiner*—Chad H Smith
(74) *Attorney, Agent, or Firm*—Kevin M. Able; Jeffrey S. Bernard; Timothy J. Aberle

(57) ABSTRACT

The present invention addresses the need for a stress relieving device and protective jacket for exposed fiber within a field-installed optical network enclosure, such as a network interface device. The present invention incorporates a furcation tube coupled with a furcation body. The coupling may be accomplished by a direct connection or with use of an external or internal transition body. The present invention enables a field-installer to transition an optical fiber cable from the field into a furcation tube thereby providing a means for attaching an optical connector, such as a mechanical splice connector, onto the optical fiber and furcation tube.

20 Claims, 10 Drawing Sheets

OPTICAL FIBER TRANSITION DEVICE

BACKGROUND OF THE INVENTION

1. Field of the Invention

The present invention relates generally to a transition device for an optical network enclosure allowing for the transition of an optical fiber contained within an optical fiber cable into a furcation tube thereby providing strain relief, protection of the optical fiber, and a means for attaching a field-installable optical connector.

2. Technical Background

Optical fibers are widely used in a variety of applications, including the telecommunications industry which utilizes optical fibers in a number of telephone and data transmission applications. The extremely wide bandwidth and low noise operation provided by optical fibers naturally leads to a broad range of possible uses, and the variety of applications in which optical fibers are utilized continues to grow. For example, optical fibers no longer serve as merely a medium for long distance signal transmission, but are being increasingly routed directly to the home and, in some instances, directly to a an office desk or other work location.

Outdoor fiber installations require robust fiber protection and therefore significant physical jacketing and reinforcement of the glass fiber is frequently utilized. The typical outdoor optical fiber cable typically includes one or more coated optical fibers disposed within a buffer tube surrounded by a protective jacket. Additionally, strength members may also be utilized to provide tensile strength and structural rigidity along the length of the cable. The strength members may be attached to, or otherwise enclosed within the outer protective jacket. The combination of the jacket, strength members, and buffer provide a rugged and durable optical fiber cable for outdoor installation. However, when the optical fiber cable reaches the customer's premises, it is necessary to strip the protective jacket, strength members, and buffer so as to allow the optical fiber to be connected to another optical fiber or optical device within a network enclosure. Generally, a furcation tube may be used to provide a more manageable jacket for the optical fiber. A furcation tube is a thin walled tube with an internal diameter greater than that of the coated optical fiber and an outer diameter sized to permit the installation of a connector onto the furcated optical fiber. The installation of the furcation tube provides a field optical fiber that can be easily installed, for example, on a field installable connector and subsequently optically connected to another optical fiber or optical device within an optical network enclosure, such as a network interface device.

In an optical network, it is necessary to split, couple, and provide transitions between individual branches of the optical network and also to provide transitioning from the optical network to a customer's equipment. A number of different types of network enclosures are used to house the optical fiber and associated connectors needed to connect customers to the optical network. Examples of enclosures include aerial mounted fiber optic closures, ground-level pedestals and cabinets, and below grade closures. Regardless of the enclosure and installation type, one of the primary purposes of the enclosure is to provide environmental protection and/or security to one or more fiber optic transitions in an optical network. Generally, this involves the use of connectors to establish quality, reliable connections between adjoining optical fibers. However, in order to install the optical connectors, the protective jacket of the optical fiber cable must be removed and the optical fiber contained within the optical fiber cable must be exposed.

An efficient method of installing optical fiber in a field installation is to use mechanical splice connectors. Mechanical splice connectors mount upon the end of an optical fiber and provide a means for easily and reliably connecting adjoining optical fibers. Such mechanical splice connectors are well known in the art, but generally require "up-jacketing" an optical fiber to include a loose-tube buffer, typically around 900 microns in diameter. One simple way to accomplish this is by applying a furcation tube onto the optical fiber. The installation of a furcation tube requires the removal of the protective jacket of an optical fiber cable leaving exposed the portion of the optical fiber between the end of the jacketed optical fiber cable and the beginning of the furcation tube to the environment. Exposing the optical fiber to the outside environment introduces serious risks of damaging the optical fiber and introducing microbends in the optical fiber that may significantly degrade the quality of optical transmission. Therefore, it would be advantageous to provide a protective body, referred to herein as a furcation body, that would permit transitioning the optical fiber contained within an optical fiber cable into a furcation tube that may further provide means for attaching a fiber optic connector, such as a mechanical splice connector.

In view of the aforementioned shortcomings, improved apparatus and methods are needed for transitioning a field optical fiber contained within an optical fiber cable into an optical network enclosure for connection to another optical fiber or device.

SUMMARY OF THE INVENTION

In one aspect, the present invention provides an apparatus and method of transitioning an optical fiber contained within an optical fiber cable into a furcation tube, thereby providing a means of attaching a field-installable optical connector. Specifically, the present invention provides a furcation body having a transition portion. The furcation body has a first and a second opening and a passage extending between the first and second opening. The first opening of the furcation body is designed to accept an optical fiber cable which contains at least one optical fiber therein. A length of coated optical fiber is exposed by stripping the protective jacket and any strength members from the optical fiber cable. The optical fiber cable is secured within the furcation body after the optical fiber is threaded through the transition portion and subsequently into a furcation tube that is coupled with the transition portion of the furcation body. The furcation tube is coupled to and may extend through a portion of the furcation body a sufficient distance so that an installer may terminate the optical fiber within the furcation tube onto an optical connector, such as a field-installable mechanical splice connector.

In another aspect of the present invention, the transition portion of the furcation body is integrally formed with the remainder of the furcation body. Alternatively, the transition portion may be comprised of a separate component designed to couple with the furcation body. The separate transition portion component is referred to herein as a transition body or furcation clip. One embodiment of the furcation clip is designed to couple to the outside or exterior of the furcation body. In such an external embodiment, the furcation clip is configured with affixing means, such as snap ears, to engage exterior features of the furcation body. In another embodiment of the present invention, the transition body couples with the furcation body on the inside of the furcation body and is held in position by the same mechanism and means that holds the optical fiber cable within the furcation body. In the internal embodiment, the transition body may also have extension arms that engage internal features of the furcation body and thereby prevent any rotational movement of the transition body relative to the furcation body.

Another aspect of the present invention is the ability for a field installer to customize the cable length for each particular application. Rather than using predetermined cable lengths with connectors already installed on each end of the optical fiber cable, the present invention provides a pigtail-type optical fiber cable where one end of the optical fiber cable is provided with a factory-installed connector and the other end may be reduced to a desired length. This significantly reduces the amount of excess cable length, and therefore minimizes cable slack storage, without requiring a large number of different length cables to be at the installer's disposal for field installation.

Yet another aspect of the present invention provides a convenient way to apply a furcation tube to an outdoor optical cable to permit the installation of a field installable connector. The optical fiber cable is stripped exposing the coated optical fiber. A predetermined length of the coated optical fiber is inserted through the furcation body and into the furcation tube. After trimming the furcation tube and stripping and cleaving the optical fiber, an optical fiber connector may be installed on the end of the optical fiber. The net result of this method is that a field-installed connector may be mounted on the optical fiber to provide connectivity to another optical fiber connector or optical device. In one embodiment, the optical connector used with the present invention is a field-installable mechanical splice connector requiring only a small hand tool to install the connector onto the optical fiber and furcation tube.

Thus, the present invention provides the ability to customize cable lengths in the field depending on the application, apply a protective furcation tube to a length of optical fiber that has had the protective jacket removed therefrom, and, finally, mount an optical connector onto the end of the optical fiber and furcation tube for coupling the optical fiber with another optical fiber or optical device.

Additional features and advantages of the invention are set forth in the detailed description which follows and will be readily apparent to those skilled in the art from the description, or will be readily recognized by practicing the invention as described in the detailed description, the drawings and the appended claims.

It is to be understood that both the foregoing general description and the following detailed description present exemplary embodiments of the invention as well as certain preferred embodiments. As such, the detailed description is intended to provide an overview or framework for understanding the nature and character of the invention as recited in the appended claims. The accompanying drawings are included to provide a further understanding of the invention, and are incorporated into and constitute a part of this specification. The drawings illustrate various preferred embodiments of the invention, and together with the detailed description, serve to explain the principles and operations thereof. Additionally, the drawings and descriptions are meant to be merely illustrative, and are not intended to limit the scope of the claims in any manner.

DETAILED DESCRIPTION OF THE PREFERRED EMBODIMENTS

Figure 1:
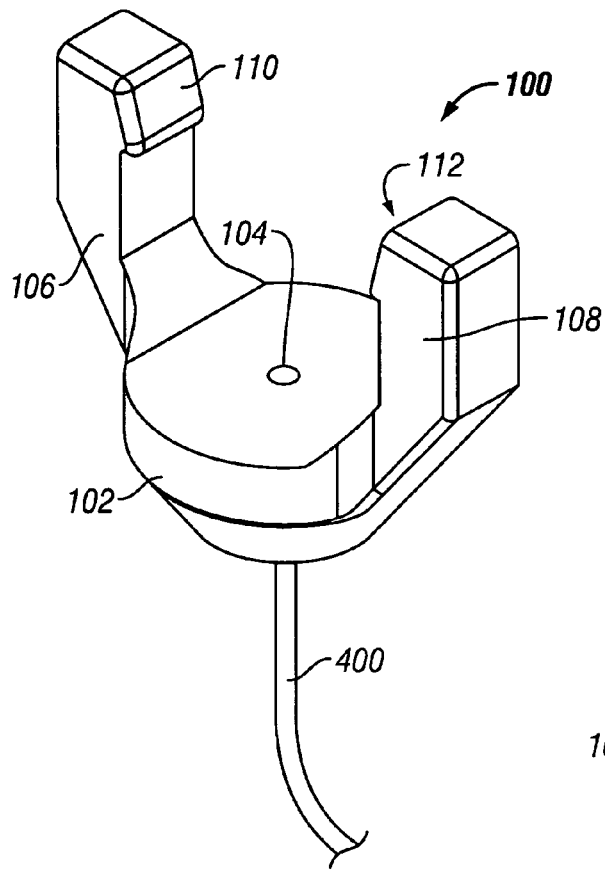
FIG. 1 shows one embodiment of the transition body according to the present invention that is intended to be mounted on the outer surfaces of a furcation body known in the art.

Reference will now be made in greater detail to various exemplary embodiments of the invention, preferred embodiments of which are illustrated in the accompanying drawings. Whenever possible, the same reference numerals will be used throughout the drawings to refer to the same or similar parts. A single fiber field-installable mechanical splice connector operable for terminating a field optical fiber to a connector is shown herein for use with the various embodiments of the invention merely for purposes of convenience. It should be understood, however, that the apparatus and methods for transitioning an optical fiber of a fiber optic cable to an optical connector disclosed herein may be applied to any optical coupling between any number of optical fibers, such as, but not limited to, any optical connection between one or more adjoining optical fibers. Accordingly, the invention should not be construed as being limited in any manner by the particular example of a single fiber field-installable mechanical splice connector provided herein.

Figure 2:
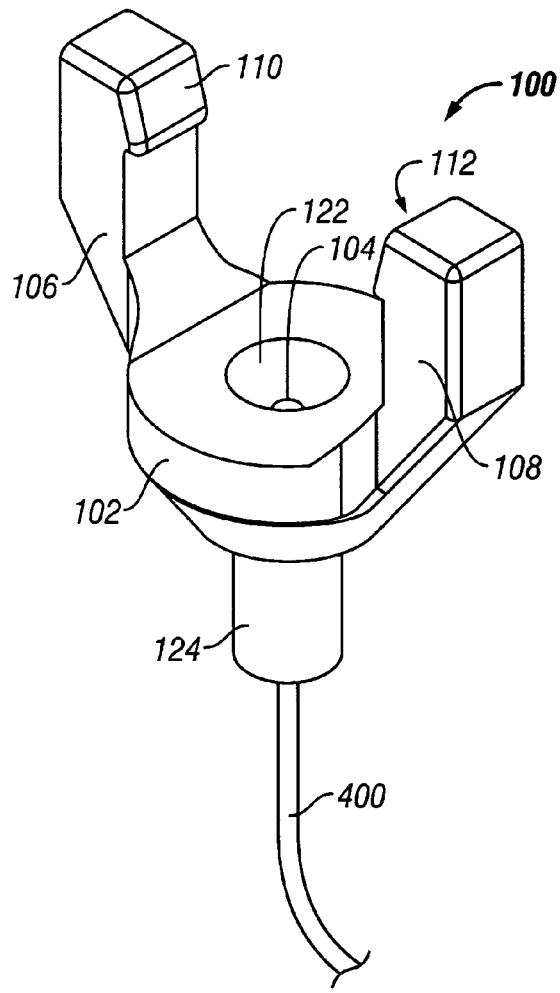
FIG. 2 shows an alternative embodiment of the transition body according to the present invention intended to adapt to the outer surfaces of a furcation body with features for providing additional strength and increasing the ease of installation.
Figure 3:
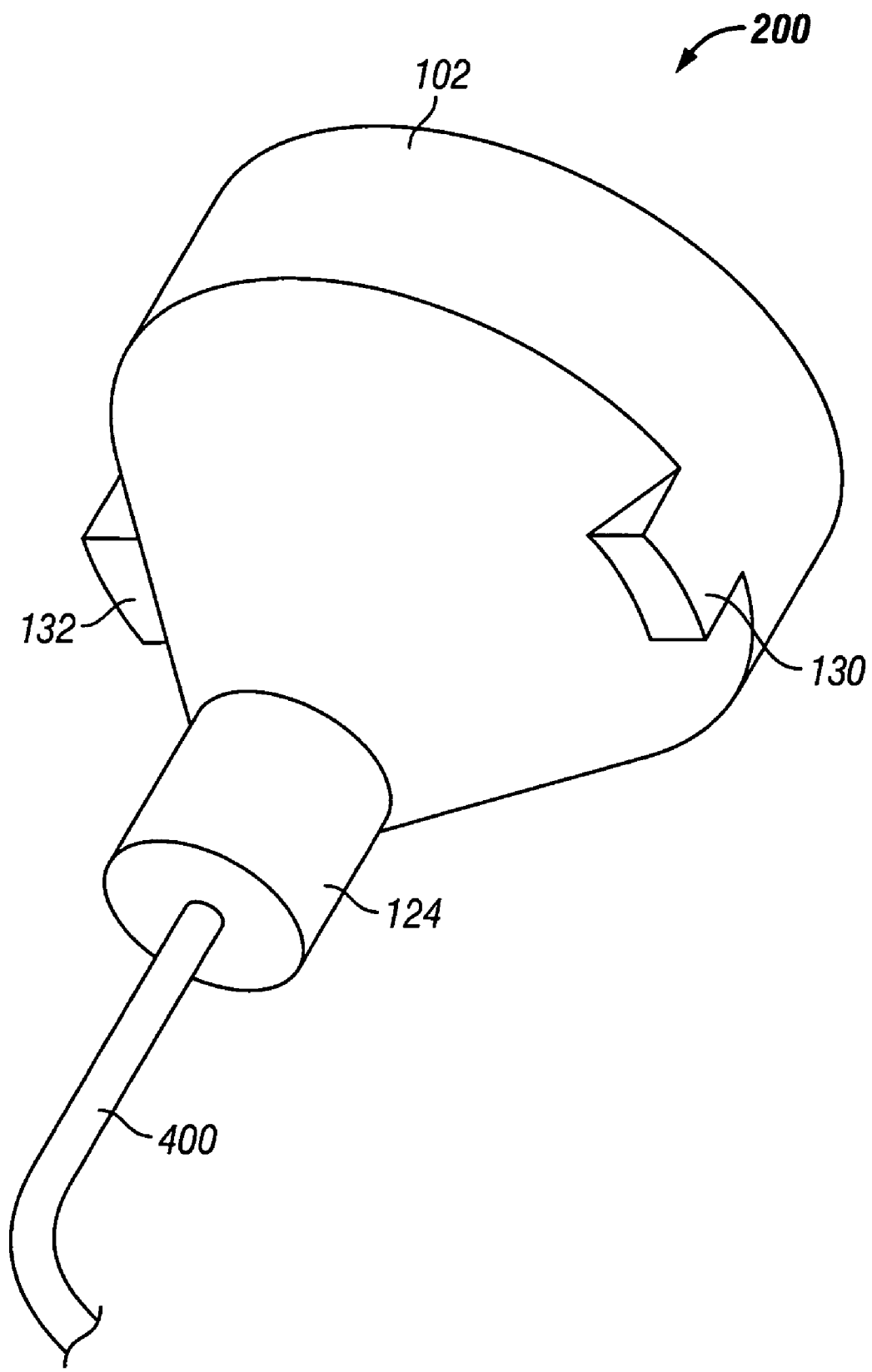
FIG. 3 is an example of yet another embodiment of the transition body according to the present invention intended to adapt to the inner surfaces of a furcation body that may be used in an optical network enclosure.

FIGS. 1, 2 and 3 show three possible embodiments of an optical fiber cable transition device in accordance with the present invention. FIG. 1 shows a first embodiment of a transition body, specifically a furcation clip 100 configured for external coupling with a known furcation body. The externally-coupled furcation clip 100 is formed around a body structure 102. The body structure 102 is generally made of plastic, but alternative materials are contemplated to be within the scope of the present invention. The body structure 102 has a through-hole 104 sized appropriately for receiving a furcation tube 400 therein. In at least one embodiment of the present invention, the furcation tube 400 has an outer diameter of about 900 microns, and extends through at least a portion of the body structure 102 of the externally-coupled furcation clip 100. The externally-coupled furcation clip 100 may be provided with a furcation tube 400 having a length of about 2-3 feet extending from the externally-coupled furcation clip 100 as manufactured, but the particular length of furcation tube 400 may be varied and cut to length in the field and affixed to the externally-coupled furcation clip 100 with the use of epoxy or other adhesive means. In the embodiment utilizing a field-installed furcation tube 400, the though-hole 104 would generally be just slightly larger than the furcation tube 400 to allow epoxy or other adhesive to be applied to the furcation tube 104 before installation into the furcation clip 100. Alternatively, the furcation tube 400 may have a slightly larger outer diameter than the through-hole 104, thereby allowing the furcation tube 400 to be press fit within the through-hole 104.

Figure 7:
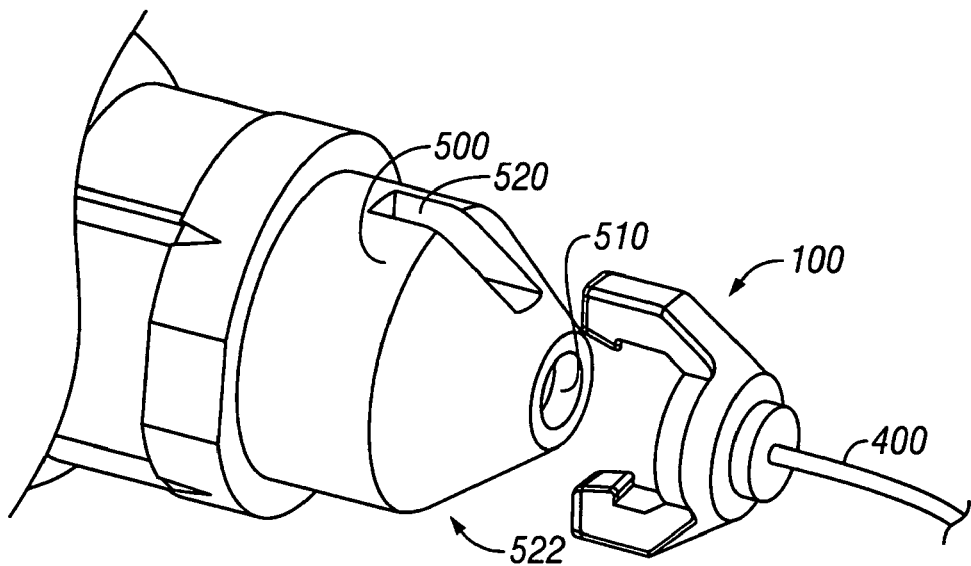
FIG. 7 shows an external transition body according to FIG. 2 prior to installation onto the furcation body.
Figure 8:
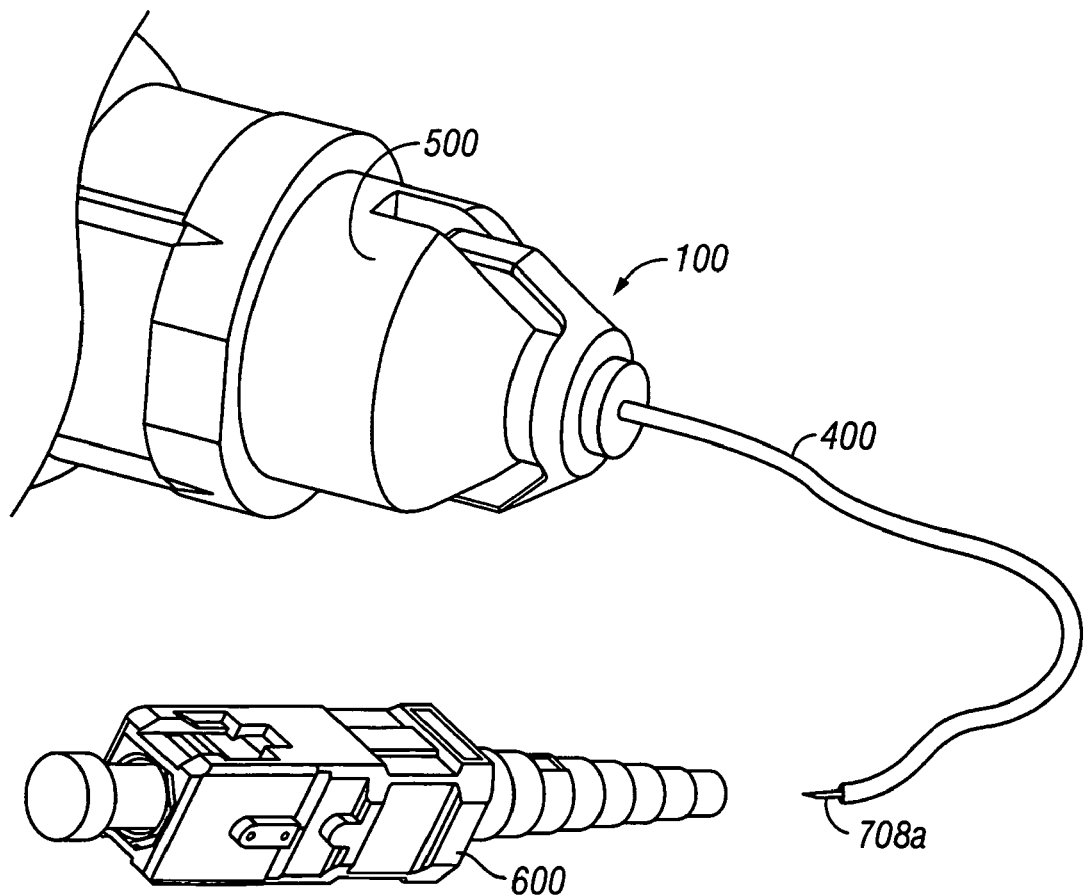
FIG. 8 shows the external transition body secured onto the furcation body including the attachment of an optical connector at one end of the present invention.

In order to couple the furcation clip 100 to a furcation body, as will be shown in FIGS. 7 and 8, the disclosed embodiment features attaching means such as an attachment feature, specifically a first attachment arm 106 and a second attachment arm 108 extending outwardly from the body structure 102. The attachment arms feature affixing means 110 and 112 used to secure the furcation clip 100 onto the furcation body. The affixing means in this embodiment are commonly referred to as "snap ears." It is within the contemplation of this invention, that the number of arms utilized in some embodiments may vary and that the affixing means utilized is not limited to snap ears. In fact, any method may be used to secure the externally-coupled furcation clip 100 onto a furcation body of the type shown in FIG. 7, including, but not limited to, the use of screws and/or adhesive.

In some embodiments of the present invention, the body structure 102 and the attachment arms 106 and 108 of the furcation clip are integrally formed from a single material, such as plastic. In an alternative embodiment, the attachment arms 106 and 108 and the body structure 102 may be separate pieces, such as an example where a similar body structure is formed from plastic, but the attachment arms may be formed from a piece of spring metal to provide the necessary retaining force for coupling the externally-coupled furcation clip 100 to the exterior of a furcation body.

FIG. 2 shows another embodiment of an externally-coupled furcation clip 100 according to the present invention. Like the earlier embodiment, this embodiment of the externally-coupled furcation clip 100 features a body structure 102 wherein a through-hole 104 extends through the body structure and the through-hole 104 is suitably sized for securing a furcation tube 400 within and extending away from the body structure 102. Similarly, attachment arms 106 and 108 feature affixing means 110 and 112 for securing the externally-coupled furcation clip 100 to a furcation body. However, this embodiment also features a conical lead-in 122 designed to assist in the field-installation of bare optical fiber into the through-hole 104 and thus into the furcation tube 400. The conical lead-in 122 assists a field installer in inserting the delicate bare glass fiber into the through-hole 104 by providing a larger target and tapered entrance to the through-hole. As will be shown in later figures, this conical lead-in 122 can be utilized in any of the disclosed embodiments.

This embodiment of the externally-coupled furcation clip 100 also features a boot 124 for providing additional structural support and rigidity to the furcation tube 400. The boot 124 provides additional strain relief when an optical fiber is installed within the boot and through a furcation tube 400 extending outwardly from the boot. It also reduces the likelihood of any sharp bends being applied to the optical fiber by providing additional rigidity for the furcation tube 400.

Figure 6:
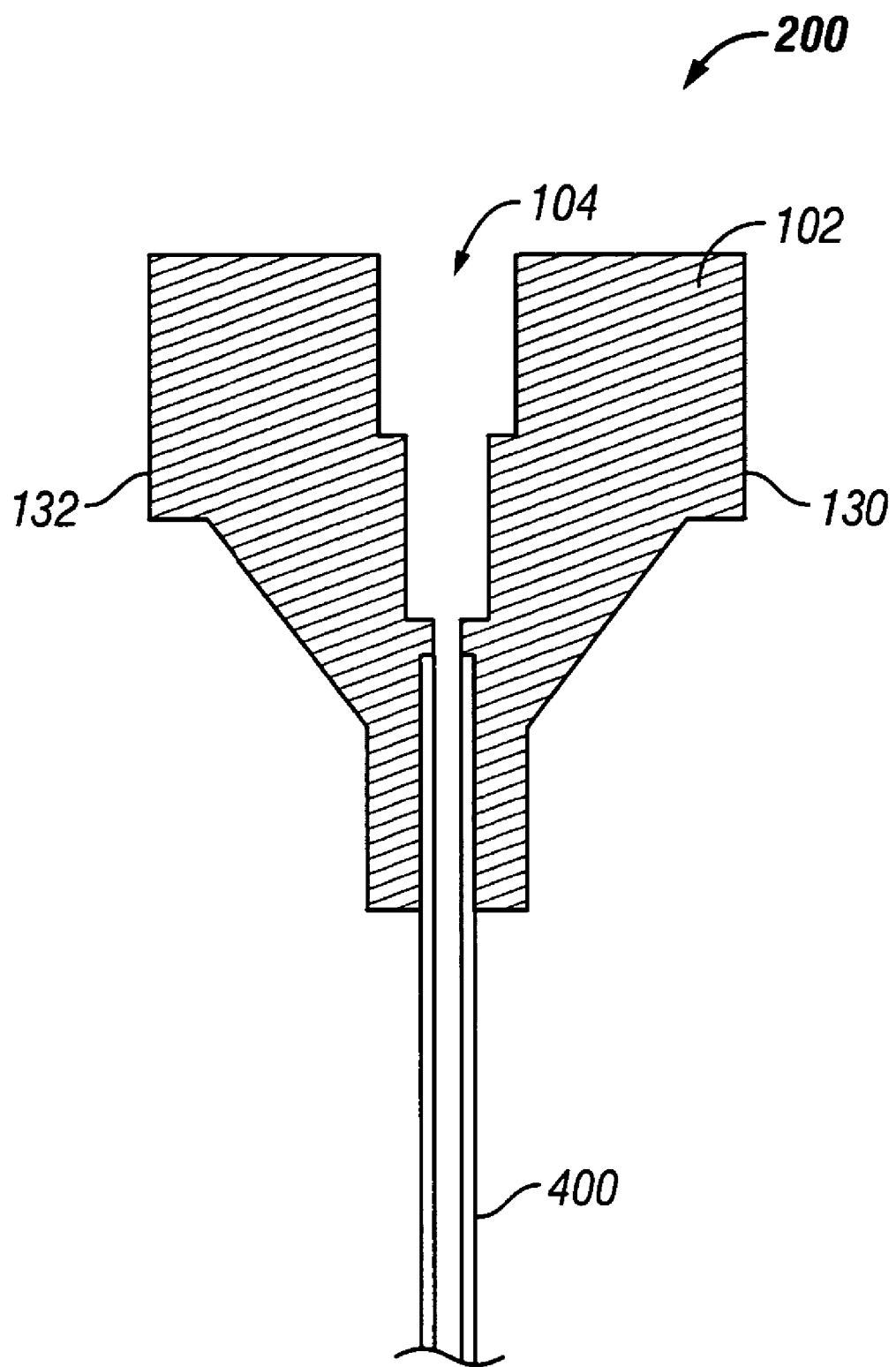
FIG. 6 is a longitudinal cross-sectional view of the embodiment shown in FIG. 3.
Figure 9:
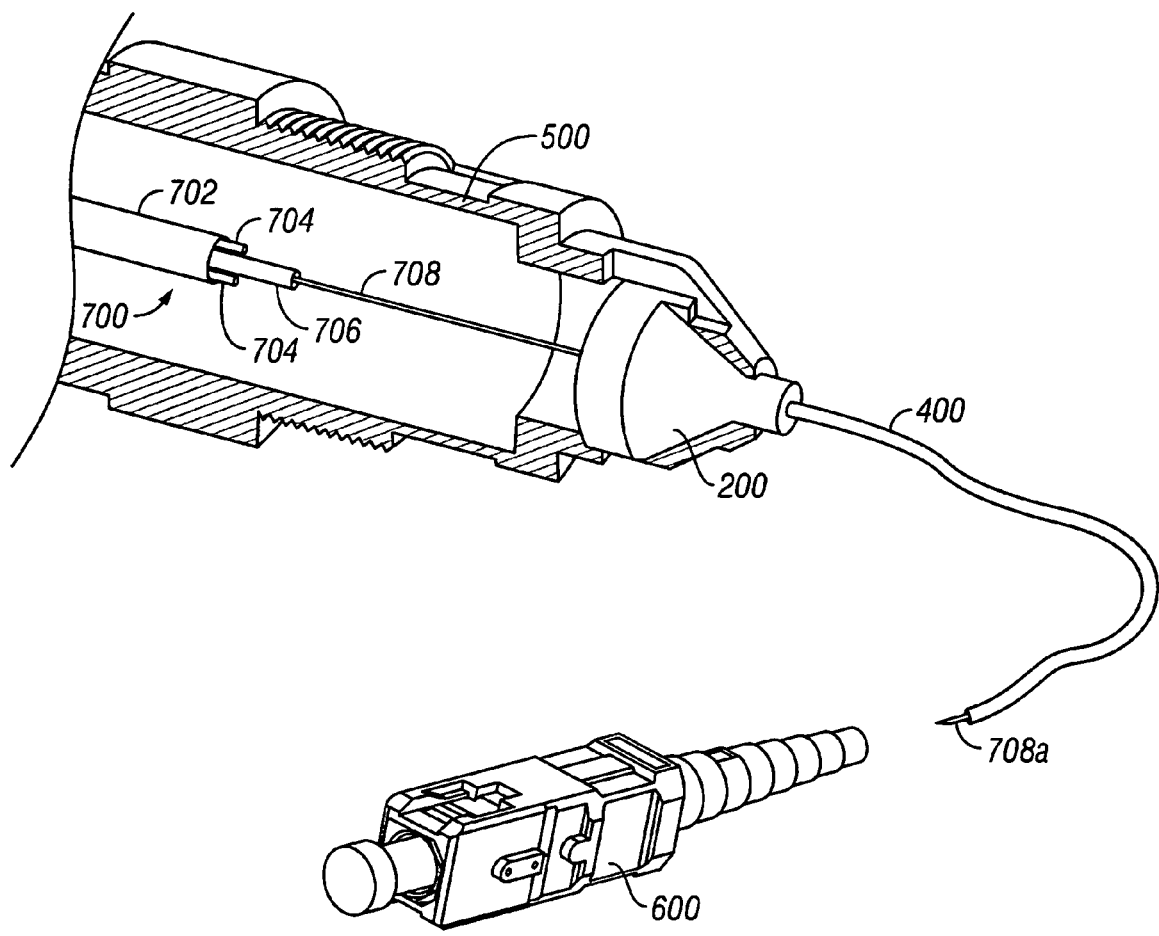
FIG. 9 illustrates the internal transition body of FIG. 3 secured within a furcation body with an optical fiber of a fiber optic cable threaded through a transition portion and into a furcation tube, such that an optical connector may be mounted upon the optical fiber.

FIG. 3 shows yet another embodiment of a transition body according to the present invention. In this embodiment, the transition body is an internally-coupled furcation clip 200 designed to be installed within a furcation body (see FIG. 9). As shown in FIG. 9, the internally-coupled furcation clip 200 also features a body structure 102 with a through-hole running therethrough with a furcation tube 400 operably coupled with the through-hole to provide a path for an optical fiber, as will be described more fully with reference to FIG. 9. FIG. 6 is a longitudinal cross-section of the internally-coupled furcation clip 200 to provide a better understanding of the interaction between the through-hole of the internally-coupled furcation clip and the furcation tube 400. Furthermore, the disclosed embodiment also features a boot 124 incorporated into the internally-coupled furcation clip 200. Finally, the disclosed embodiment of an internally-coupled furcation clip 200 also comprises a pair of short extension arms 130 and 132 for rotatably securing the device within a furcation body (as shown in FIG. 9).

Figure 4:
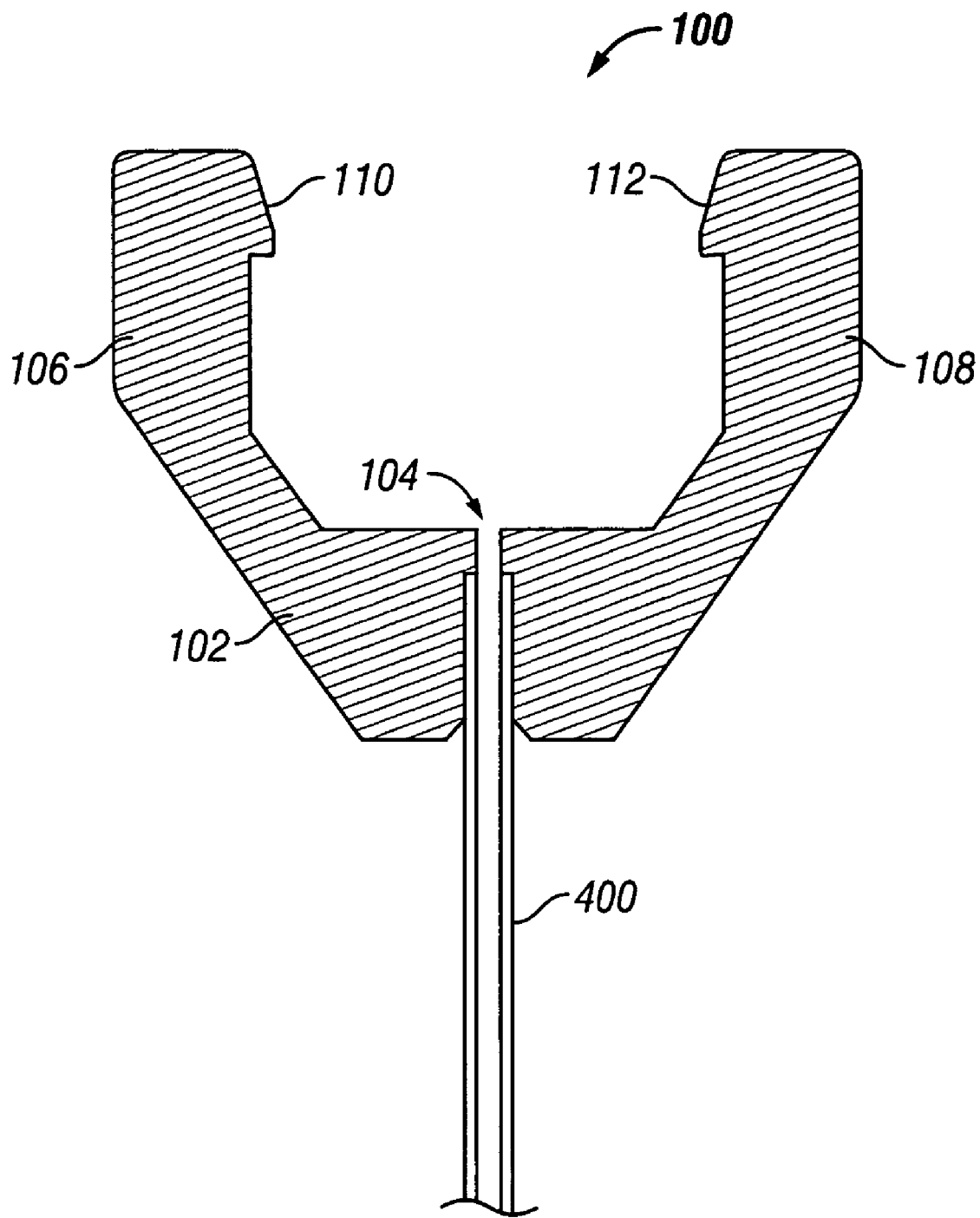
FIG. 4 is a longitudinal cross-sectional view of the embodiment shown in FIG. 1.

FIG. 4 is a longitudinal cross-section of the transition body in the form of an externally-coupled furcation clip 100 shown in FIG. 1. FIG. 4 shows a furcation clip 100 formed from a body structure 102 with a through-hole 104 and attachment arms 106 and 108. The attachment arms also have affixing means, in this case "snap ears" 110 and 112. In this embodiment, the furcation tubing 400 is already installed within the body structure 102 and through-hole 104. The furcation tubing 400 has an outer diameter that is slightly smaller than the outer diameter of though-hole 104 and the furcation tube 400 may be secured into place at the factory with the use of an epoxy or similar adhesive, or, alternatively, the field-installation may use epoxy or other adhesive to secure a custom-length furcation tube 400 to the externally-coupled furcation clip 100.

Figure 5:
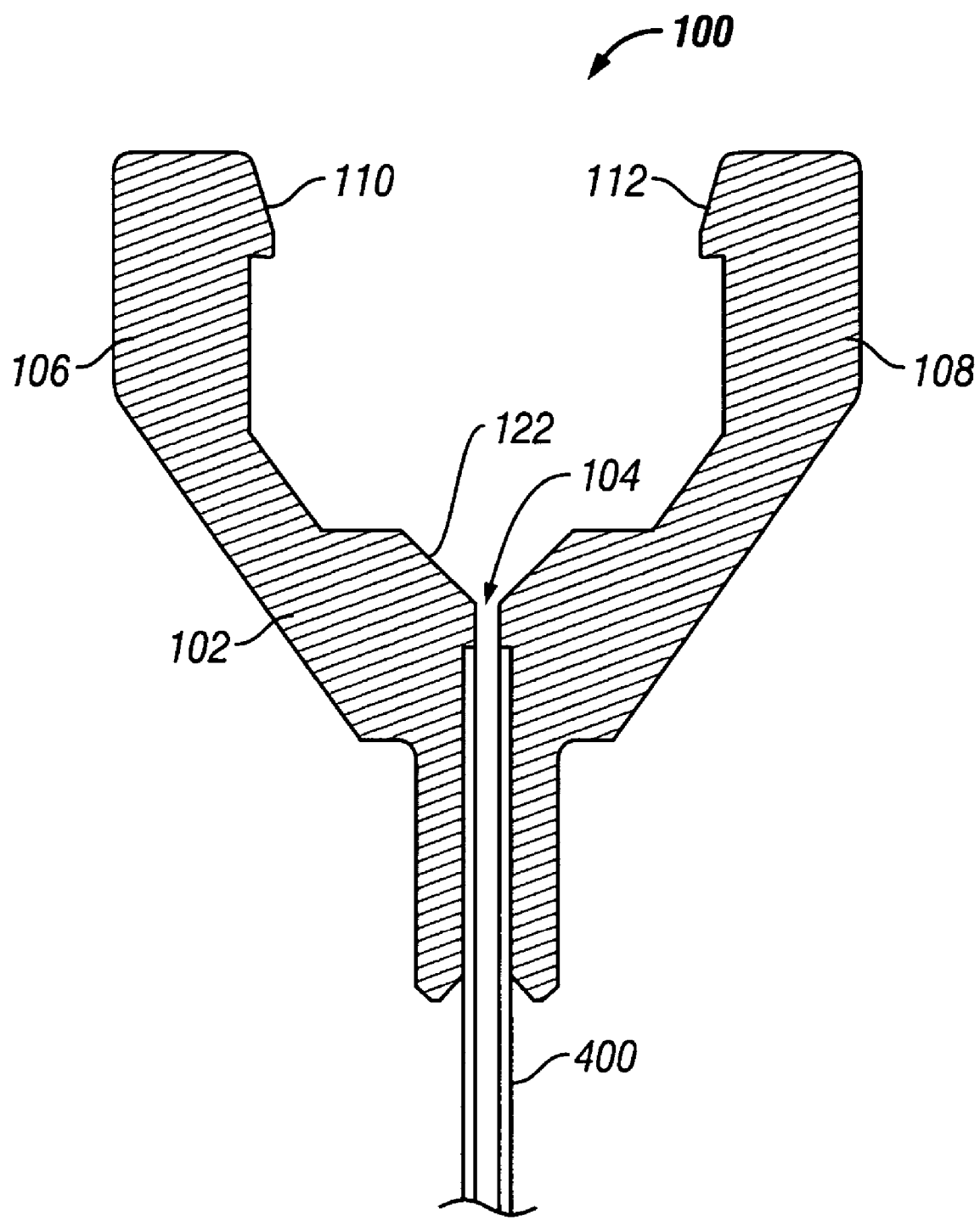
FIG. 5 is a longitudinal cross-sectional view of the embodiment shown in FIG. 2.

FIG. 5 is a longitudinal cross-section of the embodiment of the externally-coupled furcation clip 100 in FIG. 2. This particular embodiment comprises a similar body structure 102, through-hole 104, and attachment arms 106 and 108 with "snap ears" affixing means 110 and 112. However, this externally-coupled furcation clip 100 also features a conical lead-in 122 at the upper surface of the through-hole 104 and body structure 102. The conical lead-in 122, which may be accomplished with different lead-in geometries, makes introducing an optical fiber into the through-hole 104 easier as the conical lead-in 122 acts as a funnel when installing optical fiber through the transition body of the present invention, including the externally-coupled furcation clip. Again, in this embodiment, the furcation tube 400 may be attached in any of a number of different ways as described previously with reference to FIG. 4. Further, the embodiment shown in FIG. 5 also features a boot 124 extending from the main body structure 102 in the same direction as the furcation tube 400. The through-hole 104 and furcation tube 400 extend through the center of the boot 124 and along its entire length. The advantage to using a boot 124 as shown is the opportunity to provide additional strain relief for the furcation tube 400 and any optical fiber within the furcation tube 400. The rigidity of the boot 124 minimizes the risks of any sharp kinks or bends of the furcation tube 400 and the optical fiber adjacent the furcation clip 100.

FIG. 6 is a longitudinal cross-section of the embodiment of the internally-coupled furcation clip 200 of FIG. 3 suitable for installation within the interior of a furcation body. As previously described, the internally-coupled furcation clip 200 is formed around a body structure 102 and features a through-hole 104 extending along the entire length of the body structure 102. The through-hole 104 features a stepped design lead-in wherein the opening at the upper surface of the body structure 102 is larger than that at the lower portion of the body structure. Again, this lead-in design, similar to the conical lead-in design of the previously disclosed embodiment, provides guidance and assistance to a field installer when inserting an optical fiber into and through the internally-coupled furcation clip 200. The internally-coupled furcation clip 200 also features extension arms 130 and 132. As better shown with reference to FIG. 9, the extension arms 130 and 132 resist rotational movement of the transition body when installed within the interior a furcation body.

FIGS. 7 and 8 illustrate installation of the externally-coupled furcation clip 100 as described herein to the exterior of a furcation body configured for transitioning a fiber optic cable to an optical fiber disposed within a furcation tube to be optically coupled with an optical connector or optical device. In FIG. 7, the external furcation clip 100 is shown with the furcation tube 400 extending away from the furcation body 500. The furcation body 500 as shown is similar to that utilized within the OptiSheath™ family of outside plant enclosures manufactured and sold by Corning Cable Systems LLC, of Hickory, N.C. The furcation body 500 features two windows 520 and 522 for allowing an installer to view within the furcation body 500. Also the furcation body 500 features a hole 510 extending through the furcation body 500 for allowing a field optical fiber to travel into the external furcation clip 100 and the furcation tube 400. The field fiber can be seen in FIG. 9 as shown with respect to the embodiment including the internal furcation clip 200.

FIG. 8 shows an externally-coupled furcation clip 100 coupled to the exterior of the furcation body 500 with the optical fiber already threaded through the furcation clip 100 and the furcation tube 400. Mounted on the optical fiber at the other end of the furcation tube 400 is an optical connector 600. Generally, the optical connector 600 would be a splice connector or similar optical device. In the exemplary embodiments provided herein, the optical connector 600 is preferably a field-installable mechanical splice connector The optical connector 600 may be easily mounted on the about 900 micron furcation tube 400 and optical fiber within the furcation tube 400 with basic tools known in the art. As a result of the present invention, the optical fiber can be stripped to the bare glass, cleaned and cleaved, if necessary, installed within the furcation tube 400 and terminated to the mechanical splice connector, without the use of any special fusion splice equipment. The optical connector 600 may contain the only splice within the network interface device or other optical network enclosure, thereby providing minimal optical loss and introducing very little, if any, noise into the optical network. FIG. 9 may be referenced for a better view of the optical fiber when installed within a fiber optic cable transition device according to the present invention.

FIG. 9 shows an embodiment of the present invention that features a separate piece within the furcation body 500 for transitioning the fiber optic cable 700 to the optical fiber 708 contained within the furcation tube 400. In this embodiment, an internally-coupled transition body 200 is located within the furcation body 500 and fits snugly against one end of the furcation body. The fiber optic cable 700 enters the furcation body 500 and the protective outer jacket 702 is removed exposing the inner components of the cable 700. As shown, the fiber optic cable 700 contains two strength members 704 and an internal buffer tube 706 around the optical fiber 708. The strength members 704 and the buffer tube 706 are stripped back in the present invention to the point where the outer jacket 702 ends. In the example embodiment, the length that the strength members 704 and buffer tube 706 extend beyond the end of the jacket 702 is shown exaggerated for purposes of clarity.

The optical fiber 708 in FIG. 9 enters the internal transition body 200 and the furcation tube 400. By feeding the optical fiber 708 through the transition body 200 and the furcation tube 400, the end of the optical fiber 708a extends beyond the end of the furcation tube 400. Generally, the length of the optical fiber 708 and the furcation tube 400 is slightly longer than expected for a particular installation. The process of feeding an optical fiber 708 into a furcation tube 400 is one example of "up-jacketing" the optical fiber to a loose-tube optical fiber. After up-jacketing the optical fiber, it is now possible to mount a mechanical splice connector 600 to the end of the optical fiber 708 in a conventional manner. Many methods are known in the art of providing a furcated optical fiber 708 and mounting a mechanical splice connector 600 onto the optical fiber. However, the present invention is not limited to mechanical splice connectors, as any form of optical connector may be optically coupled to the end of the optical fiber 708a as appropriate. Such connectors suitable for the present invention may include, but are not limited to, fusion splice connectors and polish and epoxy connectors, however, the mechanical splice connector is the preferred optical connector for the fiber optic cable transition device of the present invention.

Figure 10:
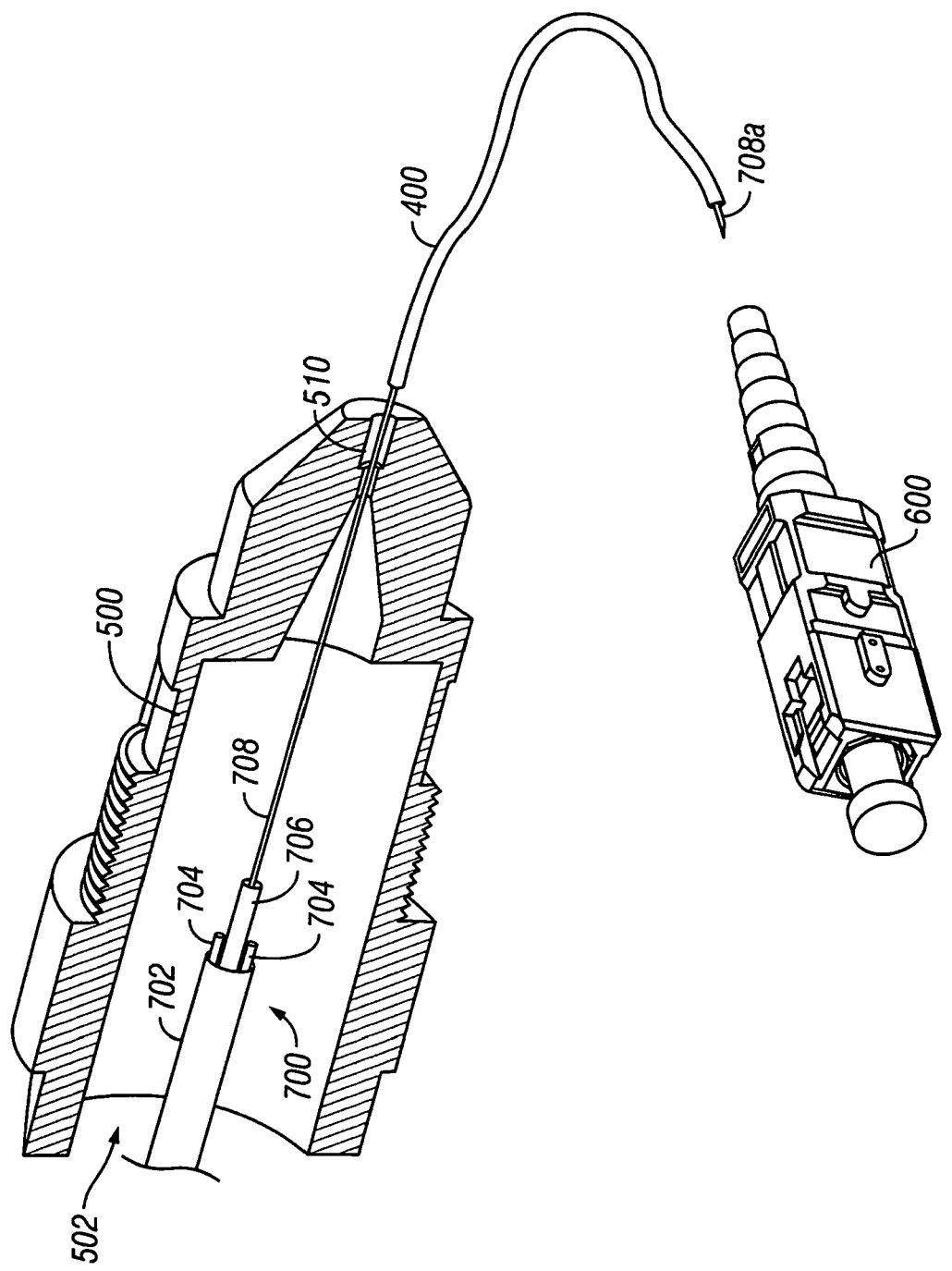
FIG. 10 shows an alternative embodiment of the present invention wherein the furcation body and the transition body are integrally formed.

FIG. 10 shows an embodiment of the present invention in which the furcation body 500 includes an integrated transition portion 300. In this embodiment, a first opening 502 of the furcation body 500 is designed to accept a fiber optic cable 700. In this embodiment, the fiber optic cable 700 has the outer protective jacket 702, strength members 104, and buffer tube 706 removed, thereby exposing the optical fiber 708. The optical fiber 708 is threaded into the integrated transition portion 300. In this embodiment, the integrated transition portion 300 contains a through hole 104 and a lead-in funnel 122. The lead-in funnel 122 assists the installer in threading the optical fiber 708 into the through-hold. The through-hole 104 has a larger diameter bore at the second opening 510. This larger diameter bore of the through-hole 102 enables the furcation tube 400 to be inserted a short distance through the second opening 510 and into the through-hole 104. The furcation tube 400 can be secured into position by epoxy or other form of adhesive or the furcation tube 400 and through-hole 104 may enable the furcation tube 400 to be simply pressure-fitted into position. After installing the furcation tube 400 over the optical fiber 708, a mechanical splice connector 600 or other type of connector may be installed on the distal end of the optical fiber 708a as is known in the art.

Figure 11:
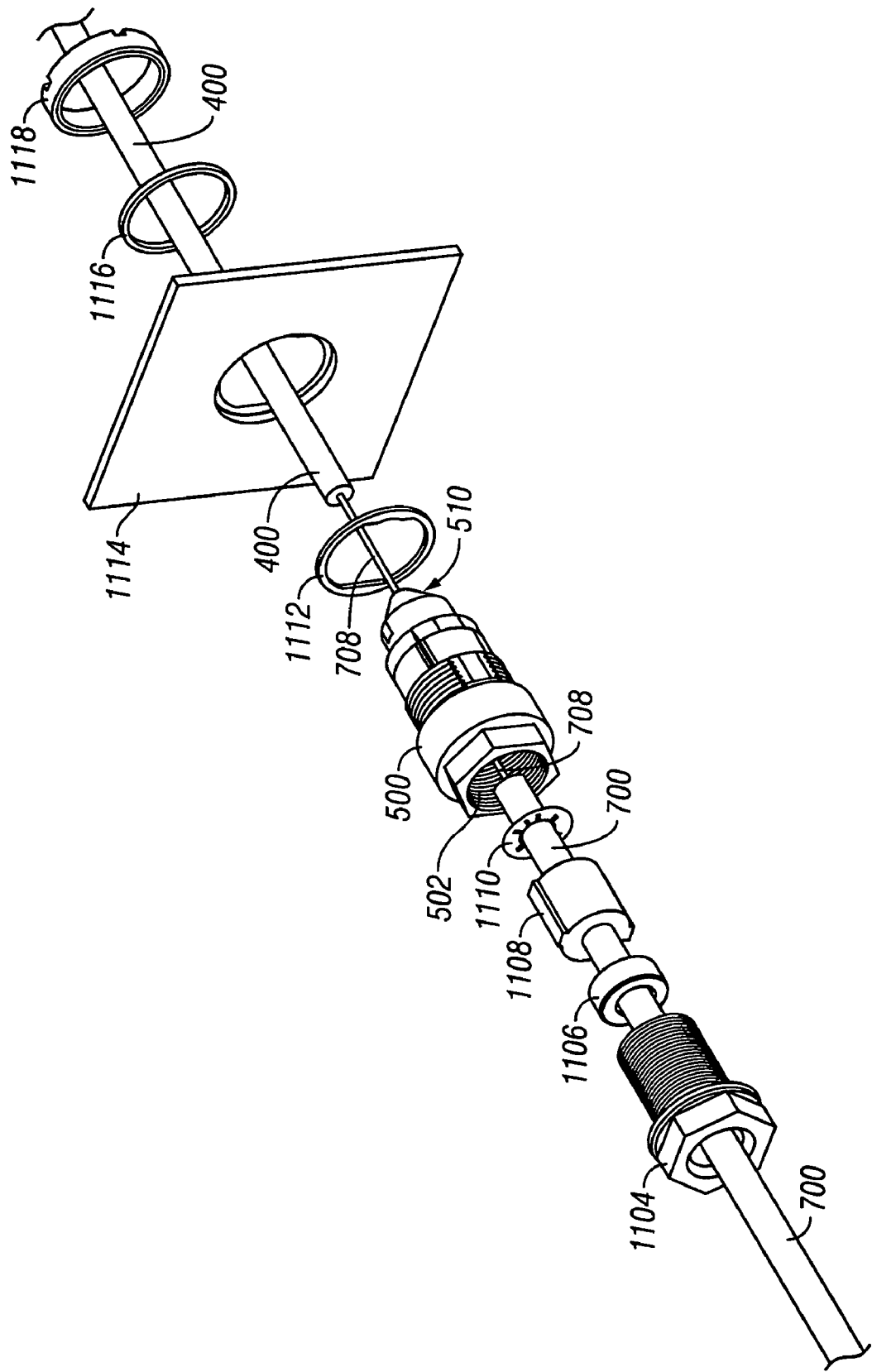
FIG. 11 is an exploded view illustrating an exemplary embodiment of a method of securing an optical fiber of an optical fiber cable onto a furcation body and mounting the furcation body to a wall of an optical network enclosure.

Referring now to FIG. 11, an example of a method of installing the present invention on an enclosure is shown by way of an exploded diagram. The furcation body 500 is shown at the center of the drawing. The furcation body 500 features a first opening 502 for accepting the optical fiber cable 700 and a second opening 510 that shows the optical fiber 708 exiting the furcation body 500 at the second opening 510. In the shown embodiment, the furcation body 500 includes an integrally formed transition portion 300 for transition the optical field fiber 708 onto the furcation tube 400 as shown in the embodiment of FIG. 10. However, a person of ordinary skill in the art would recognize that either the externally coupled transition portion 100 of FIGS. 7 and 8 or the internally coupled transition portion 200 of FIG. 9 could also be utilized to provide a furcation tube 400 for the optical fiber.

By referring now to FIG. 11, a method of securing the optical fiber cable 700 and optical fiber 708 within the furcation body 500 and attaching the furcation body 500 to an enclosure 1114 can be best explained. Generally, before stripping the buffer 706 (previously shown in FIG. 10) from the optical fiber 708, the compression bolt 1104, compression washer, and compression grommet are installed onto the optical fiber cable 700 and slide freely along the length of the optical fiber cable. Next, a strain relief washer 1110 is secured onto the optical fiber cable 700 at a point immediately before the outer jacket 702 (see FIGS. 9 and 10) is removed. The metal arms of the strain relief washer 1110 firmly engage the optical fiber cable 700. After installing the strain relief washer, the buffer 706 protecting the optical fiber 708 is removed and the optical fiber 708 is threaded through a transition portion as described in reference to FIGS. 7, 8, 9, and 10. The optical fiber 708 passes through the transition portion and into the furcation tube 400, which may be already affixed to the furcation body 500 or provided as a separate piece. The optical fiber cable 700 with the strain relief washer 1110 is inserted into a first opening 502 of the furcation body 500 and the compression grommet 1108 and compression washer 1106 are also slid into position immediately behind the strain relief washer 1110 within the furcation body 500. Subsequently, a compression bolt 1104 is engaged with the furcation body 500 to apply pressure to the compression washer 1106 and compression grommet 1108 providing the necessary force to maintain the optical fiber cable 700 in position within the furcation body 500. In the present case, the compression bolt 1104 is screwed into the furcation body 500 to apply the necessary force.

After securing the optical fiber cable 700 within the furcation body 500 with the furcation tube 400 protecting the optical fiber 708 may be threaded through a gasket 1112, wall of an enclosure 1114, washer 1116, and jam nut 1118. The gasket is placed in position between the furcation body 500 and the wall of the enclosure 1114. The gasket 1112 provides a sealing means for providing environmental sealing, if necessary. Next a washer 1116 and jam nut 1118 are used to secure the furcation body 500 into position in the wall of the enclosure 1114.

Figure 12A:
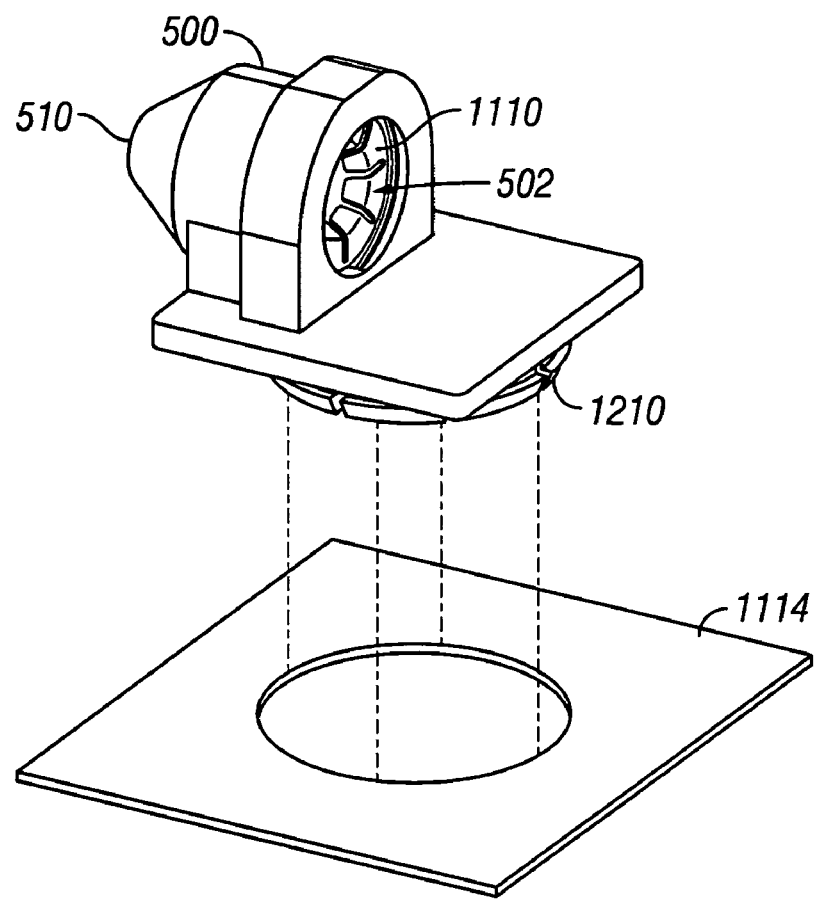
FIG. 12A is a simplified furcation body with a first and second opening and an internal strain relief washer.
Figure 12B:
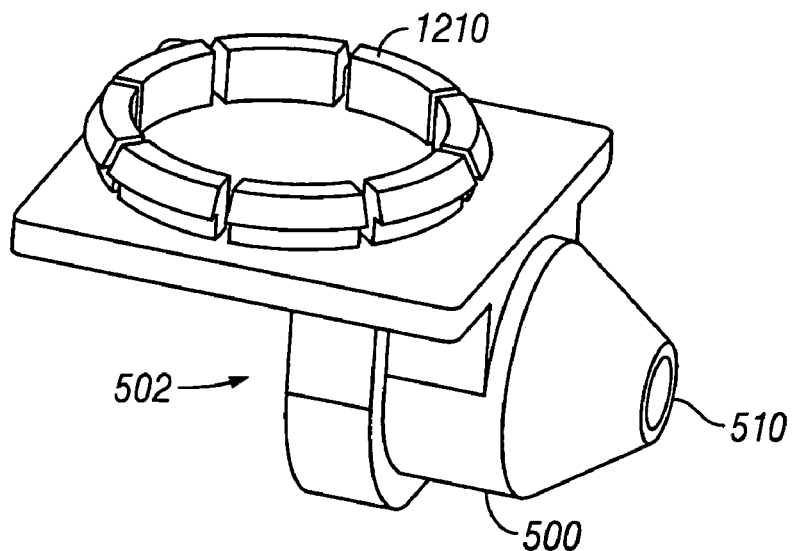
FIG. 12B shows a mounting feature only partially visible in the perspective view of the furcation body shown in FIG. 12A.

Another exemplary embodiment of the present invention is shown in FIGS. 12A and 12B. In FIG. 12A, a simplified furcation body 500 is shown with a first opening 502 and a second opening 510. Inside of the furcation body, a strain relief washer 1110 is shown, suitable for securing an optical fiber cable in the furcation body. A person having ordinary skill in the art would instantly realize that the shown embodiment may be utilized with either an integrated transition portion as disclosed in FIG. 10 or utilize an internal or external clip that couples with the furcation body 500 as disclosed. The furcation body 500 shown has a mounting feature 1210 which enables the mounting feature to engage a mounting surface 1114. In this case, the mounting surface 1114 features a hole for engaging the mounting feature 1210 of the furcation body 500. However, a person having ordinary skill in the art would instantly recognize that alternative methods of attaching two structures may be used including approaches that do not require additional tools such as snap fittings or slide-type fittings, and methods requiring some tools such as engagements using screws to affix the furcation body 500 to a mounting surface 1114.

For better understanding of the mounting feature 1210 of the furcation body 500, FIG. 12B shows one embodiment of the mounting feature 1210 as contemplated by the current invention in better detail. The mounting feature 1210 consists of a plurality of snap arms that flex slightly allowing the mounting feature 1210 to securely engage itself to any suitable mounting surface as shown in FIG. 12A.

In alternative embodiments, any number of different methods may be used to secure the optical fiber cable within the furcation body. Furthermore, although an embodiment of the present invention is shown wherein the furcation body is mounted within a wall of an enclosure, it is contemplated that the present invention may be mounted in either external or internal walls of an enclosure. Further, it is also contemplated that the furcation body may also be mounted on a wall of an enclosure or any location within an enclosure. Generally, in such embodiments, the optical fiber enters the enclosure through a rubber grommet opening to provide the necessary environmental sealing.

It will be apparent to those skilled in the art that innumerable modifications and variations can be made to the exemplary embodiments of the apparatus and methods of the invention shown and described herein without departing from the spirit and scope of the invention. Thus, it is intended that the present invention cover all conceivable modifications and variations of this invention, provided those alternative embodiments fall within the scope of the appended claims and their equivalents.

That which is claimed is:

1. An optical fiber transition device for transitioning at least one optical fiber contained within an optical fiber cable into a furcation tube, comprising:
   a furcation body having means for mounting the furcation body to a wall of an optical network enclosure, the furcation body having a first opening and a second opening and defining a passage extending between the first opening and the second opening, the first opening configured to receive an end of an optical fiber cable comprising a jacket and at least one optical fiber contained therein, a portion of the at least one optical fiber being exposed from the jacket in the furcation body and extending from the end of the optical fiber cable, and the furcation body comprising a transition portion adjacent the second opening; and
   at least one furcation tube operably coupled with the second opening of the furcation body and configured to receive the exposed portion of the at least one optical fiber.

2. The optical fiber transition device of claim 1, wherein the furcation body and the transition portion are integrally formed.

3. The optical fiber transition device of claim 1, wherein the transition portion comprises a transition body that couples the furcation tube to the second opening of the furcation body.

4. The optical fiber transition device of claim 3, wherein a substantial portion of the transition body is positioned within the passage of the furcation body.

5. The optical fiber transition device of claim 3, wherein the transition body couples to an exterior of the furcation body.

6. The optical fiber transition device of claim 1, wherein the furcation body is mounted within an opening of the wall of the optical network enclosure.

7. The optical fiber transition device of claim 1, wherein the transition portion further comprises a lead-in for assisting in the insertion of the exposed portion of the at least one optical fiber into the transition portion.

8. The optical fiber transition device of claim 1, wherein the furcation tube is integrally formed with the transition portion.

9. The optical fiber transition device of claim 1, wherein the transition portion contains a through-hole suitable for installing a portion of the furcation tube therein.

10. An optical fiber transition device for transitioning at least one optical fiber contained within an optical fiber cable into a furcation tube, comprising:
    a furcation body having an attachment feature for mounting the furcation body in a wall of an optical network enclosure, the furcation body having a first opening and a second opening and defining a passage extending between the first opening and the second opening, the first opening configured to receive an end of an optical fiber cable comprising a jacket and at least one optical fiber contained therein, a portion of the at least one optical fiber being exposed from the jacket and extending from the end of the optical fiber cable;
    a transition body coupled to the furcation body adjacent the second opening; and
    at least one furcation tube operably coupled with the second opening of the furcation body and configured to receive the exposed portion of the at least one optical fiber.

11. A method for transitioning an optical fiber cable into a furcation tube suitable for securing a connector thereto, comprising the steps of:
    providing a fiber transition device comprising a furcation body including a first opening and a second opening and defining a passage extending therebetween, the first opening configured to receive an end of an optical fiber cable, a transition body coupled to the furcation body adjacent the furcation body second opening, and at least one furcation tube operably coupled with the transition body and configured to receive the at least one optical fiber; and
    removing a protective jacket of the optical fiber cable, thereby exposing at least a portion of at least one optical fiber contained within the optical fiber cable from the protective jacket;
    inserting the at least one exposed optical fiber and the optical fiber cable into the second opening of the furcation body;
    threading the exposed portion of the at least one optical fiber into the transition body and the furcation tube; and
    mounting the furcation body on an enclosure.

12. The method of claim 11, further comprising the step of securing the optical fiber cable within the furcation body.

13. The method of claim 11, further comprising the step of installing an optical connector to a distal end of the at least one furcation tube and the at least one optical fiber contained therein.

14. The method of claim 11, wherein the furcation body is mounted on a wall of the enclosure.

15. The method of claim 11, wherein the furcation body is mounted through a wall of the enclosure.

16. The optical fiber transition device of claim 4 wherein the transition body comprises extension arms for rotatably securing the transition body within the passage of the transition body.

17. The optical fiber transition device of claim 5 wherein the transition body comprises attachment arms for coupling to an exterior of the furcation body.

18. The optical fiber transition device of claim 10 wherein the transition body comprises arms extending therefrom for engaging with the furcation body.

19. The optical fiber transition device of claim 18 wherein the transition body is positioned substantially within the furcation body passage and the arms are extension arms for preventing rotational movement of the transition body relative to the furcation body.

20. The optical fiber transition device of claim 18 wherein the arms are attachment arms for coupling the transition body to the furcation body.

* * * * *